(12) United States Patent
Hovgaard et al.

(10) Patent No.: US 11,300,101 B2
(45) Date of Patent: Apr. 12, 2022

(54) CONTROL SYSTEM FOR WIND TURBINES FOR REDUCING DISTURBANCES IN AN ELECTRICAL GRID

(71) Applicant: VESTAS WIND SYSTEMS A/S, Aarhus N (DK)

(72) Inventors: Tobias Gybel Hovgaard, Ry (DK); Poul Brandt Christensen, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 224 days.

(21) Appl. No.: 16/440,451

(22) Filed: Jun. 28, 2019

(65) Prior Publication Data

US 2019/0383265 A1    Dec. 19, 2019

(30) Foreign Application Priority Data

Jun. 13, 2018   (DK) ............................ PA 2018 70388

(51) Int. Cl.
*F03D 9/00* (2016.01)
*H02P 9/04* (2006.01)
(Continued)

(52) U.S. Cl.
CPC .......... *F03D 7/0296* (2013.01); *F03D 7/0272* (2013.01); *F03D 7/0284* (2013.01);
(Continued)

(58) Field of Classification Search
CPC ...... F03D 7/0272; F03D 7/0284; F03D 9/257; F05B 2270/337; H02J 3/24
See application file for complete search history.

(56) References Cited

U.S. PATENT DOCUMENTS 9,407,186 B2 * 8/2016 Babazadeh ............... H02J 3/16
10,374,427 B2 * 8/2019 Xu .......................... H02H 9/007
(Continued)

FOREIGN PATENT DOCUMENTS

CN    105604790 A    5/2016
EP    2865889 A1    4/2015
(Continued)

OTHER PUBLICATIONS

Danish Patent and Trademark Office Search Report for Application No. PA 2018 70388 dated Nov. 29, 2018.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

The present invention relates to a method for controlling a power plant for reducing spectral disturbances in an electrical grid being operative connected to the power plant, the power plant comprising a plant controller, at least one wind turbine and at least one auxiliary energy source, wherein the at least one wind turbine comprises a rotor adapted to drive a power generator via a shaft, wherein the generator is connectable with the electrical grid, and at least one damping controller configured to compensate structural oscillations of the wind turbine by controlling a torque on the shaft, wherein the at least one damping controller is capable of setting a limit of a control action on the shaft, the method comprising the steps of determining disturbance information for the power plant in the form of an electrical disturbance at a point of measurement electrically connected to the power plant, determining set-points for the at least one auxiliary energy source based on the determined disturbance information, and assigning the set-points to the at least one
(Continued)

auxiliary energy source in order to counteract at least part of the electrical disturbance at the point of measurement using at least part of an available amount of energy from the at least one auxiliary energy source.

13 Claims, 6 Drawing Sheets

(51) Int. Cl.
*F03D 7/02* (2006.01)
*F03D 9/25* (2016.01)
*H02J 3/24* (2006.01)
*H02S 10/12* (2014.01)

(52) U.S. Cl.
CPC ............. *F03D 9/007* (2013.01); *F03D 9/257* (2017.02); *H02J 3/24* (2013.01); *H02S 10/12* (2014.12); *F05B 2260/964* (2013.01); *F05B 2270/327* (2013.01); *F05B 2270/337* (2013.01); *H02J 2300/20* (2020.01); *H02J 2300/24* (2020.01)

(56) References Cited

U.S. PATENT DOCUMENTS

| | | | |
|---|---|---|---|
| 10,411,471 B2* | 9/2019 | McDaniel | H02J 3/008 |
| 10,680,440 B2* | 6/2020 | McDaniel | H02J 3/381 |
| 10,720,774 B2* | 7/2020 | McDaniel | H02J 3/46 |
| 10,742,038 B2* | 8/2020 | McDaniel | H02J 3/46 |
| 2012/0139241 A1 | 6/2012 | Haj-Maharsi et al. | |
| 2012/0139243 A1 | 6/2012 | Koerber | |
| 2014/0003200 A1 | 1/2014 | Lamarche | |
| 2015/0381089 A1 | 12/2015 | Tarnowski et al. | |
| 2021/0140408 A1* | 5/2021 | Gomes | H02J 7/0068 |

FOREIGN PATENT DOCUMENTS

| | | |
|---|---|---|
| WO | 2010069456 A2 | 6/2010 |
| WO | 2013004252 A2 | 1/2013 |
| WO | 2016058610 A1 | 4/2016 |

OTHER PUBLICATIONS

Danish Patent and Trademark Office First Technical Examination of Application No. PA 2018 70388 dated Dec. 3, 2018.
European Patent Office examination Report for Application 19179866.9 dated Jul. 28, 2021.

* cited by examiner

CONTROL SYSTEM FOR WIND TURBINES FOR REDUCING DISTURBANCES IN AN ELECTRICAL GRID

FIELD OF THE INVENTION

The invention relates to control of at least one wind turbine, particularly to controlling a damping controller of one or more wind turbines as well as one or more associated auxiliary energy source in order to reduce structural tower oscillations as well as power oscillations provided to an associated electrical grid.

BACKGROUND OF THE INVENTION

Structural oscillations in wind turbines caused e.g. by the wind may be damped actively by generating counteracting oscillations. Such counteracting oscillations may be generated by inducing variations in the shaft torque, e.g. by varying a power or torque set-point for the generator of the wind turbine. The variations may be generated by a damping controller.

However, counteracting oscillations generated by inducing variations in the shaft torque, e.g. by varying a power or torque set-point for the generator of the wind turbine, may result in undesired power oscillations from the wind turbines as addressed in for example WO 2016/058610 A1. Moreover, there may be grid requirements in the form of so-called grid codes, as the maximum allowed power oscillations.

SUMMARY OF THE INVENTION

It may be seen as an object of embodiments of the present invention to provide a method and an associated system that facilitate that structural tower oscillations may be effectively damped without exceeding grid requirements in terms of allowable power oscillations.

In order to comply with the above-mentioned object the present invention relates, in a first aspect, to a method for controlling a power plant for reducing spectral disturbances in an electrical grid being operative connected to the power plant, the power plant comprising a plant controller, at least one wind turbine and at least one auxiliary energy source, wherein the at least one wind turbine comprises a rotor adapted to drive a power generator via a shaft, wherein the generator is connectable with the electrical grid, and at least one damping controller configured to compensate structural oscillations of the wind turbine by controlling a torque on the shaft, wherein the at least one damping controller is capable of setting a limit of a control action on the shaft, the method comprising the steps of determining disturbance information for the power plant in the form of an electrical disturbance at a point of measurement electrically connected to the power plant, determining set-points for the at least one auxiliary energy source based on the determined disturbance information, and assigning the set-points to the at least one auxiliary energy source in order to counteract at least part of the electrical disturbance at the point of measurement using at least part of an available amount of energy from the at least one auxiliary energy source.

The term electrical grid may be defined as an interconnected electrical network for delivering electricity from one point, e.g. a power source, to another point, e.g. a consumer. The electrical grid can have different voltage levels, e.g. for transmission and distribution. In context of the present invention, the electrical grid may sometimes for short be termed 'the grid'. In some embodiments, the point of measurement for the electrical disturbance may be located in, or near, the electrical grid, in particular in, or near, the point of connection (PoC) between the at least one wind turbine with the electrical grid.

The present invention is advantageous in that an electrical disturbance at a point of measurement may be at least partly counteracted by using at least part of the available amount of energy from the at least one auxiliary energy source. As it will be described in further details below electrical disturbances may originate from compensating structural oscillations of the wind turbine by controlling a torque on the shaft.

The set-points for the at least one auxiliary energy source may be selected so that the electrical disturbance at the point of measurement complies with a restriction value. The method may further comprise the step of setting a limit to the control action on the shaft in order to comply with the restriction value in case the available amount of energy from the at least one auxiliary energy source is insufficient. The restriction value may relate to a level of maximum allowed power oscillations, and the restriction value be set by the transmission system operator (TSO) also sometimes referred to as the grid operator.

The at least one auxiliary energy source may in principle comprise any type of energy source, including a combination of a plurality of energy sources which may be of the same type, or alternatively, different types of energy sources. Also, an appropriate power controller as well as suitable charging and converter arrangements may be provided for leading power to/from the at least one auxiliary energy source. The at least one auxiliary energy source may thus comprise at least one photovoltaic element. Moreover, the at least one auxiliary energy source may further comprise an energy storage element, such as a battery, for storing excess energy from the at least one photovoltaic element.

Photovoltaic elements and batteries are advantageous in that they do not have any moving parts which ensures silent operation and low maintenance costs. Furthermore, there is the green-tech related benefit associated with photovoltaic elements and batteries as they do not run on, for example, gas or diesel—thus photovoltaic elements and batteries do not give off toxic exhaust. Moreover, photovoltaic elements and batteries can be operated with minimum input from the user. During the day, the electricity charges the batteries (as long as there is enough daylight) and excess generated power is consumed. At night, the stored energy in the batteries may be used to accommodate the required power.

The control action performed by damping controllers may be restricted dependent on measured disturbance information determined from measured power at a point of measurement and/or restricted dependent on available power in the photovoltaic elements and batteries. Accordingly, if the disturbance information indicates disturbances, e.g. power variation amplitudes at a given frequency, above a given threshold, a limitation of the damping control action may be invoked in order to avoid or at least reduce further increases in the disturbance information.

Each wind turbine may comprise one damping controller arranged to damp a specific structural oscillation or a plurality of damping controllers arranged to damp different structural oscillations. The determined restriction value may be determined for one of the one or more damping controllers of a wind turbine. Accordingly, a plurality of restriction values, possibly different restriction values, may be determined for a plurality of damping controllers of a wind turbine.

The point of measurement for the electrical disturbance may be located anywhere on an electrical power connection between and including the output of the wind turbine and the electrical grid. In other embodiments, the point of measurement for the electrical disturbance may be located anywhere on an electrical power connection between the wind turbine—but not including the direct output of the wind turbine—and the electrical grid. The point of measurement may comprise a power meter capable of measuring the active power.

In the case of a plurality of wind turbines, a plurality of restriction values, possibly different restriction values, may be determined for a plurality of damping controllers or the plurality of wind turbines. Accordingly, a plurality of restriction values may be assigned to the plurality of damping controllers of the wind turbines. In embodiments with a plurality of wind turbines, it may be particularly advantageous that the point of measurement for the electrical disturbance may be located in, or near, the electrical grid, in particular in, or near, the PoC between the plurality of wind turbines and the electrical grid.

It should be noted that the present invention is particularly advantageous when a plurality of wind turbines, e.g. a so-called 'wind park' or 'wind farm' or "power plant", is controlled according to embodiments of the invention because combined oscillations of the wind turbines are normally not in phase, and therefore the combined contribution of these oscillations to the electrical disturbance in the grid could be lower than the simple sum, but nevertheless there may be a significant electrical disturbance worth reducing with the present invention by measuring in, or near, the electrical grid, particularly in, or near, the PoC between the plurality of wind turbines and the electrical grid.

According to an embodiment the method further comprises selecting at least one of the damping controllers based on the disturbance information, and assigning the restriction value to the selected damping controller. Similarly, the method may further comprise selecting at least one of the auxiliary energy sources based on the disturbance information, and assigning the restriction value thereto.

The disturbance information may contain information such as spectral information which may be used to identify a particular damping controller and a particular auxiliary energy source. The disturbance level may be used to determine if the disturbance is significant enough to invoke a restriction in the damping activity of the particular damping controller by selecting that particular controller.

According to an embodiment the method further comprises selecting at least one of the damping controllers based on damping compensation values describing levels of damping compensation performed by the damping controllers, and assigning the restriction value to the selected damping controller.

The damping compensation values may be used to identify which damping controller induces the largest shaft torque variations. These controllers may be selected for restricting the damping activity of the most active damping controllers. According to an embodiment the damping compensation values are determined based on output values from the damping controllers.

A damping controller may further be selected based both on damping compensation values and disturbance information so that the restriction value can be assigned to the selected damping controller.

According to the present invention the plant controller may be configured to process at least information relating to disturbance information and the available amount of energy from the at least one auxiliary energy source. Moreover, the plant controller may be configured to generate set-points for the at least one damping controller in order to counteract tower oscillations and generate set-points for the at least one auxiliary energy source in order to counteract power oscillations. A determination of an available amount of energy from the at least one auxiliary energy source may at least partly be based on a weather forecast, indicating hours of sun radiation influx and thus the available energy that can be extracted from the sun energy.

It is recognized that solar energy may not be available at all times. However, the available solar energy is surely predictable to at least some extent for example by using statistical material. This varying solar energy may be taken into account when calculating the design loads on the wind turbine.

According to the embodiments which comprise selection of at least one of the damping controllers based on disturbance information and/or damping compensation, the plurality of damping controllers may be comprised by a single wind turbine or a plurality of wind turbines. Similarly, a selected auxiliary energy source or sources may be associated with a single wind turbine or a plurality of wind turbines. In the case were each of a plurality of wind turbines comprises one or more damping controllers, the selection of the at least one damping controller, and assignment of one or more restriction values, may be performed among the damping controllers of the plurality of wind turbines. This may involve an initial selection of one or more wind turbines which contains damping controllers to be restricted. However, selection of damping controllers could also be performed directly when the control system for controlling the at least one wind turbine is able to receive damping compensation values from damping controllers from different wind turbines and/or contains information, e.g. information about spectral location of power variation peaks, which enables selection of the damping controllers from different wind turbines based on the disturbance information.

According to an embodiment the method further comprises determining wind turbine restriction values based on the restriction value for a plurality of the wind turbines, assigning the turbine restriction values to the wind turbines, and assigning the turbine restriction value for one of the wind turbines to the damping controller of the wind turbine for setting the limit of the control action.

Advantageously, in a power plant comprising a plurality of wind turbines supplying power to the grid, the restriction value, i.e. the total restriction value, is divided into wind turbine restriction values for one or more of the wind turbines and/or auxiliary energy source restriction values for the one or more auxiliary energy sources. The wind turbine and/or auxiliary energy source restriction values may be determined simply by dividing the total restriction value equally between the wind turbines and/or auxiliary energy sources, or by other methods, e.g. dependent on the damping activity performed by individual wind turbines and/or auxiliary energy sources or dependent on the disturbance information, e.g. spectral locations of disturbance peaks in an amplitude spectrum. The determined individual wind turbine and/or auxiliary energy source restriction values are assigned to the one or more damping controllers of each of the wind turbines which have been provided with a wind turbine restriction value and/or assigned to power converters of the one or more auxiliary energy sources.

According to an embodiment the method further comprises selecting at least one of the wind turbines based on the disturbance information, and assigning the wind turbine restriction values to the selected wind turbines. Alternatively or additionally, the method may further comprise selecting at least one of the wind turbines based on damping compensation values describing levels of damping compensation performed by the damping controllers of the wind turbines, and assigning the turbine restriction values to the selected wind turbines. Accordingly, wind turbine may also be selected based on a combination of disturbance information and damping compensation values.

According to an embodiment the restriction value, i.e. the total restriction value, is determined as a function of a difference between a disturbance value determined from the disturbance information and a desired disturbance value. Accordingly, the restriction value may be determined so that the damping controllers are continuously restricted, if required, to keep the disturbance value at an acceptable level.

According to an alternative embodiment the restriction value is determined by comparing a disturbance value determined from the disturbance information with predetermined one or more predetermined threshold values.

It is understood that the disturbance information may comprise spectrally resolved disturbance information, e.g. an amplitude spectrum containing the spectral distribution of power variation amplitudes within a frequency range.

In a second aspect the present invention relates to a power plant comprising a plant controller, at least one wind turbine and at least one auxiliary energy source,
wherein the at least one wind turbine comprises
a rotor adapted to drive a power generator via a shaft, wherein the generator is connectable with the electrical grid, and
at least one damping controller configured to compensate structural oscillations of the wind turbine by controlling a torque on the shaft, wherein the at least one damping controller is capable of setting a limit of a control action on the shaft, wherein the plant controller is configured to
determine disturbance information for the power plant in the form of an electrical disturbance at a point of measurement electrically connected to the power plant,
determine set-points for the at least one auxiliary energy source based on the determined disturbance information, and
assign set-points to the at least one auxiliary energy source in order to counteract at least part of the electrical disturbance at the point of measurement using at least part of an available amount of energy from the at least one auxiliary energy source.

Similarly to the first aspect, the at least one auxiliary energy source may in principle comprise any type of energy source, including a combination of a plurality of energy sources, which may be of the same type, or alternatively, different types of energy sources. Also, an appropriate power controller as well as suitable charging and converter arrangements may be provided for leading power to/from the at least one auxiliary energy source. The at least one auxiliary energy source may thus comprise at least one photovoltaic element. Moreover, the at least one auxiliary energy source may further comprise an energy storage element, such as a battery, for storing excess energy from the at least one photovoltaic element.

As addressed above the point of measurement may coincide with a point of common coupling between the power plant and an electrical grid.

The plant controller may be configured to process at least information relating to disturbance information and the available amount of energy from the at least one auxiliary energy source, generate set-points for the at least one damping controller, and generate set-points for the at least one auxiliary energy source. Moreover, the plant controller may comprise a distributor configured to assign the restriction value to at least one of the damping controllers and/or at least one of the auxiliary energy sources. The set-points for the at least one damping controller and the at least one auxiliary energy source may be generated as discussed in relation to the first aspect.

In a third aspect the present invention relates to a control system for a power plant comprising a plant controller, at least one wind turbine and at least one auxiliary energy source, wherein the plant controller is configured to
determine disturbance information for the power plant in the form of an electrical disturbance at a point of measurement electrically connected to the power plant,
determine set-points for the at least one auxiliary energy source based on the determined disturbance information, and
assign set-points to the at least one auxiliary energy source in order to counteract at least part of the electrical disturbance at the point of measurement using at least part of an available amount of energy from the at least one auxiliary energy source.

The control system may be configured to process at least information relating to disturbance information and the available amount of energy from the at least one auxiliary energy source, and generate set-points for the at least one auxiliary energy source. Moreover, the control system may be configured to generate set-points for at least one damping controller of the type disclosed in relation to the first aspect. The set-points for the at least one damping controller and the at least one auxiliary energy source may be generated as discussed in relation to the first aspect.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

In a general aspect the present invention relates to a method for reducing structural tower oscillations as well as power oscillations provided to an electrical grid. Structural tower oscillations in relation to wind turbine towers caused e.g. by the wind may be damped actively by generating counteracting oscillations. Such counteracting oscillations may be generated by inducing variations in the shaft torque, e.g. by varying a power or torque set-point for the generator of the wind turbine. This may however result in power oscillations at the electrical grid.

The performance of the wind turbine may be improved by utilizing damping controllers. However, the dampening of the structural oscillations by means of generator torque is limited by grid restrictions on the power oscillations, or flicker on the grid power.

According to the present invention the performance of the wind turbine can be further improved by introducing an auxiliary energy source which is coupled to the same PoC as the wind turbine. The auxiliary energy source can support the wind turbine in different operating conditions and help smoothen the power oscillations caused by damping controllers at the electrical grid. The auxiliary energy source thus facilitates the possibility for the damping controllers to dampen the structural oscillations more than in the case without an auxiliary energy source.

Figure 1:
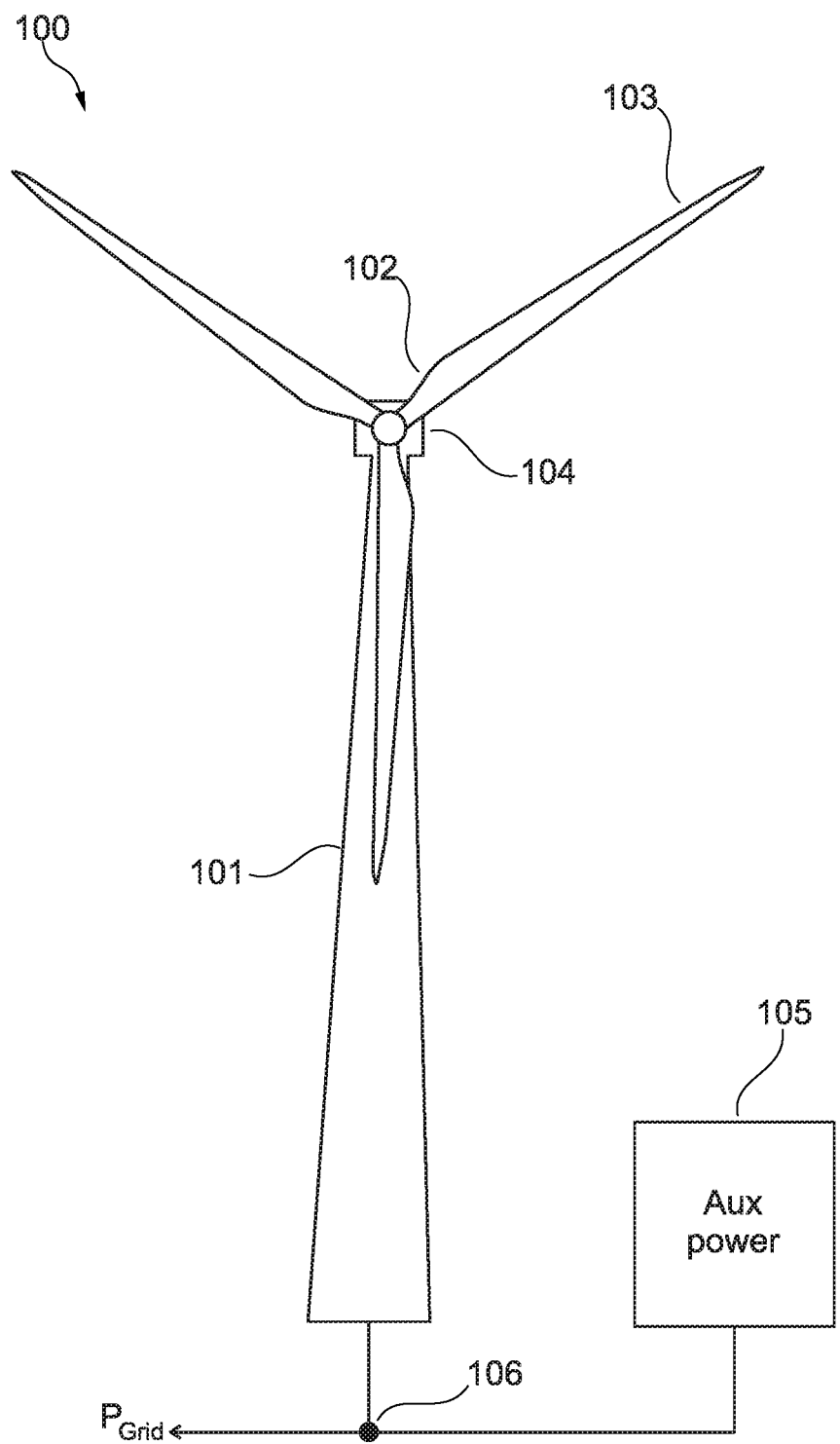
FIG. 1 shows a wind turbine together with an auxiliary energy source coupled to the electrical grid.

FIG. 1 shows a wind turbine 100 comprising a tower 101 and a rotor 102 with at least one rotor blade 103, in general the rotor may comprise more blades, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The wind turbine 100 may also be referred to with the common abbreviation WTG (Wind Turbine Generator). The WTG 100 is connected to a PoC 106 together with an auxiliary energy source 105. The auxiliary energy source 105 may involve one or more photovoltaic elements (PV), one or more battery energy storage systems (BESS), one or more power generating units or combinations thereof.

According to an embodiment, the WTG 100 may be configured so that the torque on the shaft and/or the electric power produced by the generator can be controlled via a control input to the generator, e.g. via a control input to a power inverter or power converter electrically connected to the generator. The control input may be in the form of a power reference or a torque reference. The control input may be supplied directly to the generator, inverter or converter, or indirectly via a power controller or a torque controller which controls the generator. In addition, also the pitching of the blades are controlled in order to control the rotation speed of the shaft. The auxiliary energy source 105 may be used to support the WTG 100 in power production during low wind conditions. It may also be used to maintain constant power at the PoC 106 due to fluctuating power production from the WTG.

According to another embodiment of the invention, there may be more than one auxiliary energy source 105. Moreover, the auxiliary energy sources 105 may be a combination of one or more different types of auxiliary energy sources, such as a PV and a BESS. The PV may be backed up by the BESS such that the BESS may be used as an energy storage device. The BESS may be used to absorb the power at the peak of the oscillations and release it when the power at the PoC is below the average, which enables the possibility of tower dampening during night time. The PV may be used to generate electrical power in order to support the load demand and/or to support the WTG 100 in different operating conditions.

According to an embodiment of the invention, there may be a group of WTGs 100 having one or more auxiliary energy sources 105 associated therewith. The group of WTGs 100 and the one or more auxiliary energy sources are connected to the same PoC 106, see FIG. 5. The aggregation effect of having a plurality of WTGs 100 and auxiliary energy sources 105 may be that the power oscillations at the PoC 106 may be averaged, see FIG. 6.

Structural components of the WGT 100, such as the tower, may be influenced by the wind and other effects to oscillate. Such structural oscillations affect the structural components with fatigue loads and, therefore, it may be desired to damp such oscillations.

In an embodiment of the invention the WTG comprises a damping controller (see damping controller 404-406 in FIG. 4) configured to damp structural oscillations by inducing variations in the shaft torque. The torque variations cause structural oscillations in structural components. It is possible to damp the undesired oscillations by inducing torque variations which generate structural oscillations which counteract the undesired oscillations. The torque variations can be created in response to variations in the control input for the generator (i.e. the control input in the form of a power reference or a torque reference).

For example, the damping controller may be a tower damping controller configured to damp tower oscillations. The tower damping controller may be configured to modify a power control input, i.e. a power set-point, to the generator so that the control input comprises sinusoidal variations. The variations in the control input generate variations in the shaft torque which generate tower oscillations having a frequency and phase which counteract the tower oscillations. The tower oscillations can further be due to misalignment, waves and ice on blades.

Since the control input for the generator contains variations, the power generated by the generator varies in response the control input variations. The power from the generator and, therefore, also the power variations, are supplied to the grid. Certain amplitudes of power variations may be acceptable, but generally variations in the power output due to torque damping activities from a wind turbine are undesired. As it will be disclosed in further details below the power variations from the generator may be counteracted by controlling the auxiliary energy source 105 in certain manner whereby variations in the power output due to torque damping activities from a wind turbine may be significantly reduced if not completely avoided.

Figure 2:
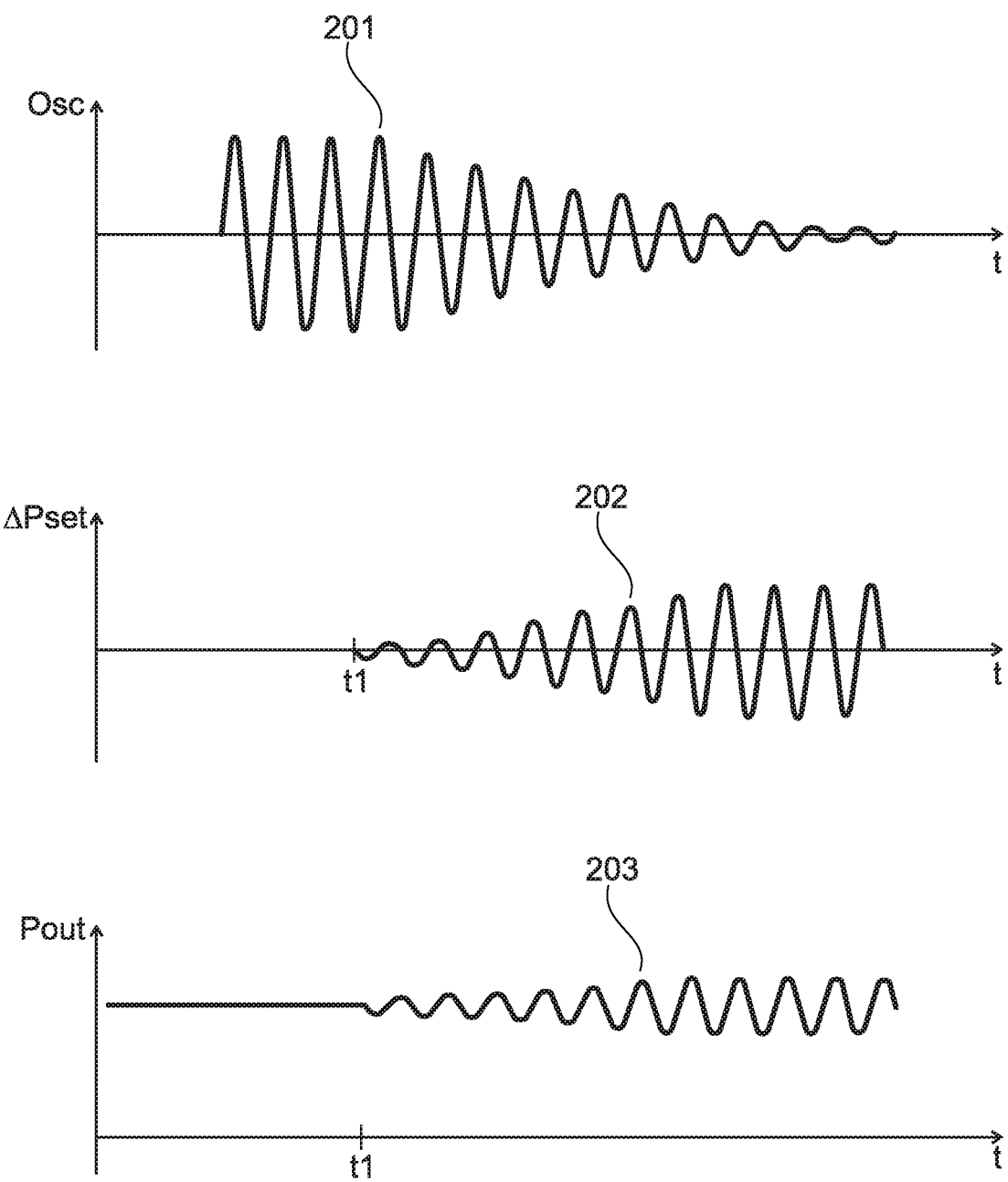
FIG. 2 illustrates an example of structural oscillations and variations in shaft torque and generator power.

FIG. 2 illustrates an example of structural oscillations 201 (Osc) as a function of time t, such as tower top lateral vibrations. The oscillations 201 are damped by inducing torque variations 202 in the shaft from time t1. The torque variation may be set-point variations ($\Delta$Pset) super-imposed onto the power set-point signal.

The signal 202 may reflect the power set-point variation ($\Delta$Pset) to be super-imposed onto the power set-point to counter the tower vibrations of 201. The torque variations will in itself induce structural oscillations, which when properly timed will counteract the structural oscillations 201, via structural oscillations induced by the torque variations and, therefore, the structural oscillations start to decay after time t1. Since the torque variations in the shaft are generated by the generator, e.g. by varying the power set-point, the amplitude of the power from the generator Pout varies correspondingly with the torque variations and with the same or substantially the same frequency. The variations in the power output 203 is illustrated with an exaggerated amplitude of the variations.

The power variations 203 caused by a damping controller may have a particular frequency or may have a spectral range corresponding to the spectral range of the control signal generated by the damping controller. A wind turbine 100 may have more than one damping controller where each damping controller may be configured to damp different structural oscillations. Accordingly, different damping controllers of a wind turbine generator may generate power variations 203 having different spectral ranges.

Herein the term "spectral range" or "spectrum" refer to a range of frequencies describing frequencies of the control signal, generator power, power variations or other parameters relating to physical quantities. Accordingly, a "spectral range" may also be referred to as a frequency range and a spectrum may also be referred to as a frequency spectrum.

The power variations 203 caused by damping controllers, i.e. power variations in a spectral range, are also referred to as spectral disturbances 203 or power disturbances 203 since they appear as disturbing power variations in particular spectral ranges, typically at frequencies below 2 Hz. The spectral disturbances may, in case they are not counteracted using power from the auxiliary energy source, be present in the electrical grid or other power lines connected with a wind turbine, e.g. power lines connecting wind turbines with the grid.

Figure 3:
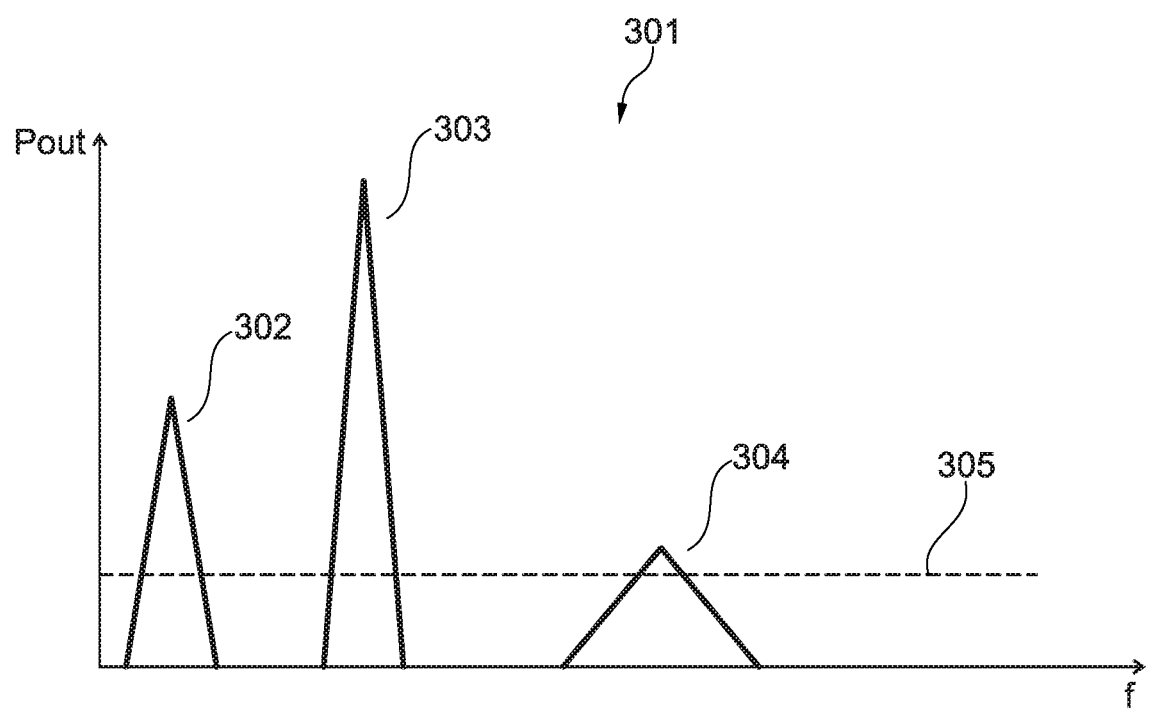
FIG. 3 illustrates an amplitude spectrum of power variations from a generator.

FIG. 3 shows a schematic example of an amplitude spectrum 301 of amplitudes Pout of power variations 202 within a frequency spectrum or frequency band between 0 and 2 Hz. The different amplitude peaks 302-305 may correspond to spectral disturbances due to damping actions from different damping controllers. FIG. 3 also shows a threshold line 305 indicating acceptable amplitudes of the spectral disturbances.

Figure 4:
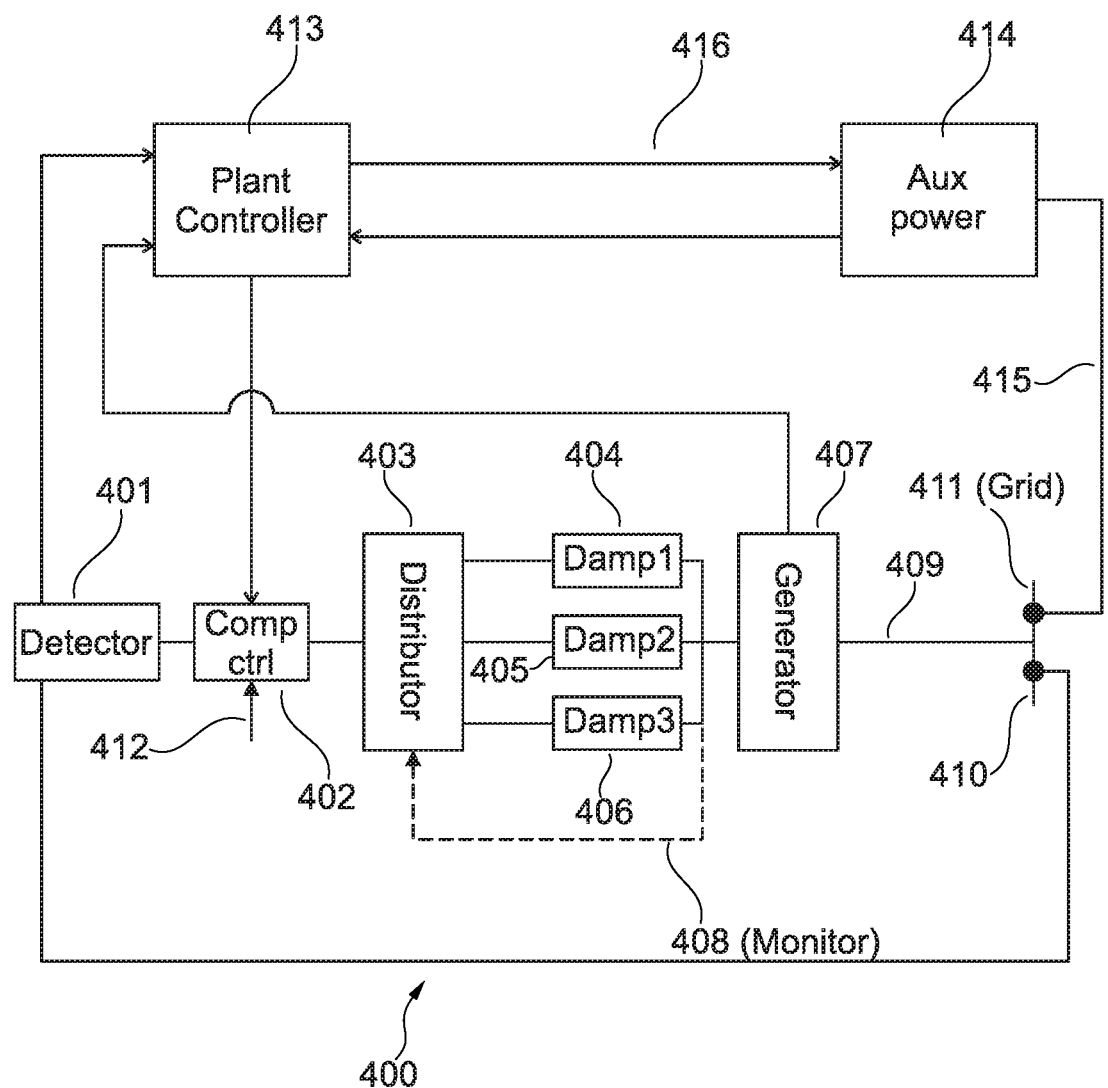
FIG. 4 shows a control system for controlling a one wind turbine for reducing spectral disturbances in an electrical grid.

FIG. 4 shows a control system 400 according to an embodiment of the invention for at least one wind turbine 100 capable of delivering electrical power to an electrical grid 411. The control system is configured for reducing spectral disturbances 203 in the electrical grid 411.

The generator 407 of the wind turbine is connected with the electrical grid 411, for example via a power line 409. The wind turbine may be configured in different ways, for example as described in connection with FIG. 1.

According to this embodiment, the wind turbine comprises at least one damping controller 404-406 (Damp1-Damp3) configured to compensate structural oscillations of the wind turbine by controlling a torque on the shaft via a control input to the generator. Each of the damping controllers 404-406 comprises an output for supplying a control signal, e.g. to a torque controller, for generating shaft torque variations by means of the power generator.

The damping control signals from different damping controllers may be combined into a single control signal, e.g. a combined control signal, intended for generating shaft torque variations by means of the power generator, e.g. via the torque controller.

The wind turbine generator 407 principally illustrates systems of the wind turbine, e.g. the torque controller, which receives the damping control signals or the combined control signal and systems which generate electric power and inject the power to the grid 411. Accordingly, wind turbine generator 407 includes the coupling between the shaft torque variations induced in response to the damping control signal and the power variations 203 in the electrical power supplied to the electrical grid.

One or more of the damping controllers 404-406 are configured to set a limit of the control action on the shaft dependent on a restriction value or a value derived from a restriction value supplied via an input to each of the damping controllers. By control action is meant e.g. the amplitude of variations in the damping control signal. By limiting the control action the amplitude of torque variations 202 generated in response to the damping control signal and, therefore, the amplitude of the power variations 203 is limited correspondingly.

For example, the damping controller 404 may be configured with an adjustable limit function arranged to set a limit on the output from the damping controller, e.g. the output from a PI control algorithm, so that the control action can be reduced if the output from the control algorithm exceeds the limit. The limit is adjusted in response to the restriction value or in response to a value derived from the restriction value. The damping controller with an integral control-function, e.g. a PI control-function, may be provided with an anti-windup function in order to handle the limit function.

The control system comprises a detector 401 (Detector) configured to determine disturbance information describing an electrical disturbance at a point of measurement 410 electrically connected to the wind turbine. The point of measurement 410 may be located anywhere on an electrical power connection between and including the output of the wind turbine and the grid 411. The point of measurement 410 may alternatively be located anywhere on an electrical power connection between the wind turbine and the grid 411. The point of measurement 410 may comprise a power meter capable of measuring the active power. The disturbance information may be in the form of a value describing variations in the power.

For example, the detector 401 may be configured to determine a low pass filtered power signal (in order to remove the normal AC component, e.g. the 50 Hz component) and to determine the disturbance information as variations in the low pass filtered signal. In another example, the detector 401 may be configured to determine disturbance information by determining amplitudes of power variations 203 within a frequency spectrum, possibly in the form of an amplitude spectrum 301. For that purpose the detector 401 may be configured with a spectrum analyzer such as a FFT analyzer. Accordingly, the disturbance information may be in the form of a value describing an average amplitude value of the amplitude peaks 302-305 or values describing the amplitudes of different amplitude peaks 302-305 within a frequency spectrum. The detector 401 may be configured with a threshold function so that the disturbance information is set to e.g. zero in case the determined disturbance information is below a given threshold. For example, if an amplitude peak 302-305 is below the threshold line 305 the disturbance information may be set to a zero or other suitable value.

The control system further comprises a compensation controller 402 (Comp ctrl) configured to determine a restriction value for one of the damping controllers 404-406, and/or configured to determine restriction values for two or more damping controllers. Moreover, the compensation controller 402 receives a control signal from the plant controller 413, indicating a limit on the magnitude of power oscillations from WTGs caused by tower dampening. The control signal is determined based on the actual WTG power oscillation that is applied. The determined restriction value is outputted by the compensation controller 402 as an output value. The restriction value is determined based on the determined disturbance information from the detector 401 and the control signal from the plant controller 413.

The compensation controller 402 may be configured to determine the restriction value by comparing a disturbance value determined from the disturbance information and the control signal from the plant controller 413 with predetermined one or more predetermined threshold values. For example, the compensation controller may be configured to determine the restriction value as a simple binary output value, e.g. 0 and 1, or an ON and OFF value, dependent on a magnitude of the disturbance information and the control signal from the plant controller 413, e.g. in comparison with a threshold 305. The compensation controller could also be configured to generate a predetermined number of output values, e.g. three or more values in the interval 0 to 1, e.g. in comparison with a corresponding number of predetermined threshold values.

Alternatively, the compensation controller 402 may comprise a feedback controller, e.g. a PI controller, configured to determine the restriction value dependent on a difference between a disturbance value determined from the disturbance information and the control signal from the plant controller 413, and a desired disturbance value, i.e. a reference disturbance value provided via input 412. In this way, the restriction value may be determined so that it is proportional to the difference and possibly dependent on a time integrated value of the difference between the disturbance information and the control signal from the plant controller 413, and the reference.

The damping controller 404 may be configured so that the adjustable limit of the damping controller is set according to a predetermined look-up table or a function defining a relation between the restriction value and the limit of the damping controller, i.e. dependent on a value derived from the restriction value. For example, the damping controller may contain a look-up table defining limits in percentages relative to a nominal limit or absolute limits. As an example, the limit may be set to 100% or zero in case the restriction value is equal to one implying that the damping control action of the affected damping controller 404 is reduced to zero. When the control action is reduced to zero any power variations 203 potentially caused by the affected damping controller are removed.

Generally, the limit of the damping controller may be set as an absolute value, an absolute reduction (e.g. reduce limit by a certain percentage), or a relative value or reduction (e.g. relative to an actual or recent activity level of the damping controller). The absolute value, the absolute reduction or relative change is determined dependent on the restriction value, e.g. by means of a look-up table.

Alternatively, the adjustable limit value of the controller 404-406 may be identical to the restriction value so that a conversion via e.g. a look-up table is not required.

The control system may further comprise a distributor 403 (Distributor) configured to assign the restriction value to one or more of the damping controllers 404 for setting the limit of the control action. Clearly, for wind turbines with only one damping controller 404 a distributor is not required since the assignment of the restriction values may be a fixed assignment or the assignment could be performed e.g. by the compensation controller 402.

For example, the distributor 403 may be configured to assign the restriction value, i.e. the same restriction value, to all damping controllers 404-406 of a wind turbine.

The distributor 403 may also be configured to distribute the restriction value among a plurality of damping controllers. For example, the restriction value may be distributed by assigning a fraction of the restriction value to each of the damping controller. For example, if three damping controllers should be limited, derived restriction values equal to one third of the original restriction value may be distributed among the damping controllers.

The distributor 403 may be configured to select at least one of the damping controllers 404-406 based on the disturbance information and to assign the restriction value (original or derived restriction value) to the selected damping controller.

For example, the disturbance information may be in the form of values describing the amplitudes of different amplitude peaks 302-305 within a frequency spectrum of the power variations 203. Since particular amplitude peaks may be associated with particular damping controllers 404-406, one or more damping controllers may be selected according to the levels of the amplitude peaks 302-305.

The control system 400 may further comprise an activity monitor 408 (Monitor) configured to determine compensation values describing levels of damping compensation performed by the damping controllers 404-406. The compensation values may be determined based on output values from the damping controllers 404-406, e.g. from individual damping control signals from different damping controllers 404-406 or from a combined damping control signal, e.g. by determining root-mean-square value(s) of the damping control signals.

The distributor 403 may be configured to select at least one of the damping controllers 404-406 based on damping compensation values from different damping controllers 404-406 and to assign the restriction value to the selected damping controller(s). For example, the restriction value may be assigned to the damping controller having the largest damping compensation values, or plurality of restriction values may be assigned or distributed to the damping controllers having the largest damping compensation values.

The control system may further comprise a plant controller 413 configured to determine a set-point value 416 for the auxiliary energy source(s) 414, and/or configured to control a limit on the amplitude of the wind turbine oscillations due to tower dampening (for each WTG 100 in the wind farm). The set-point value 416 and the control limit may be based on measurements at the point of measurements 410 (or PoC 106, cf. FIG. 1) and the generated power by the WTG together with information regarding grid requirements and the availability of power from the auxiliary energy source 414. These measurements require information about the actual power oscillation at the point of measurement 410 (or PoC 106, cf. FIG. 1) and the power output of the WTG that is sent to the plant controller 413. Thus, the plant controller 413 may control the output of the auxiliary energy source(s) 414 to counteract the oscillations just enough to comply with the grid requirements.

In another embodiment of the invention, the measurement of power at the point of measurement 410 or PoC 106 and the WTG output are directly measured by the plant controller 413.

The plant controller 413 may be configured to select at least one auxiliary energy source 414 based on the availability of auxiliary power, and assign a set-point value to the selected auxiliary energy source(s). For example, the set-point value may be assigned to the auxiliary energy source having largest amount of auxiliary power available, or a plurality of set-point values may be assigned to the auxiliary energy sources having the largest amount of auxiliary powers available. The auxiliary energy source 414 provides power to the electrical grid via the connection 415.

The plant controller 413 may be configured to send a control signal, based on the actual WTG power oscillation, to the compensation controller 402 for controlling the amplitude of the WTG power oscillations. An alternative may be that, the plant controller 413 directly sends the control signal to the generator 407, and thus controlling the electrical power output of the generator 407.

Figure 5:
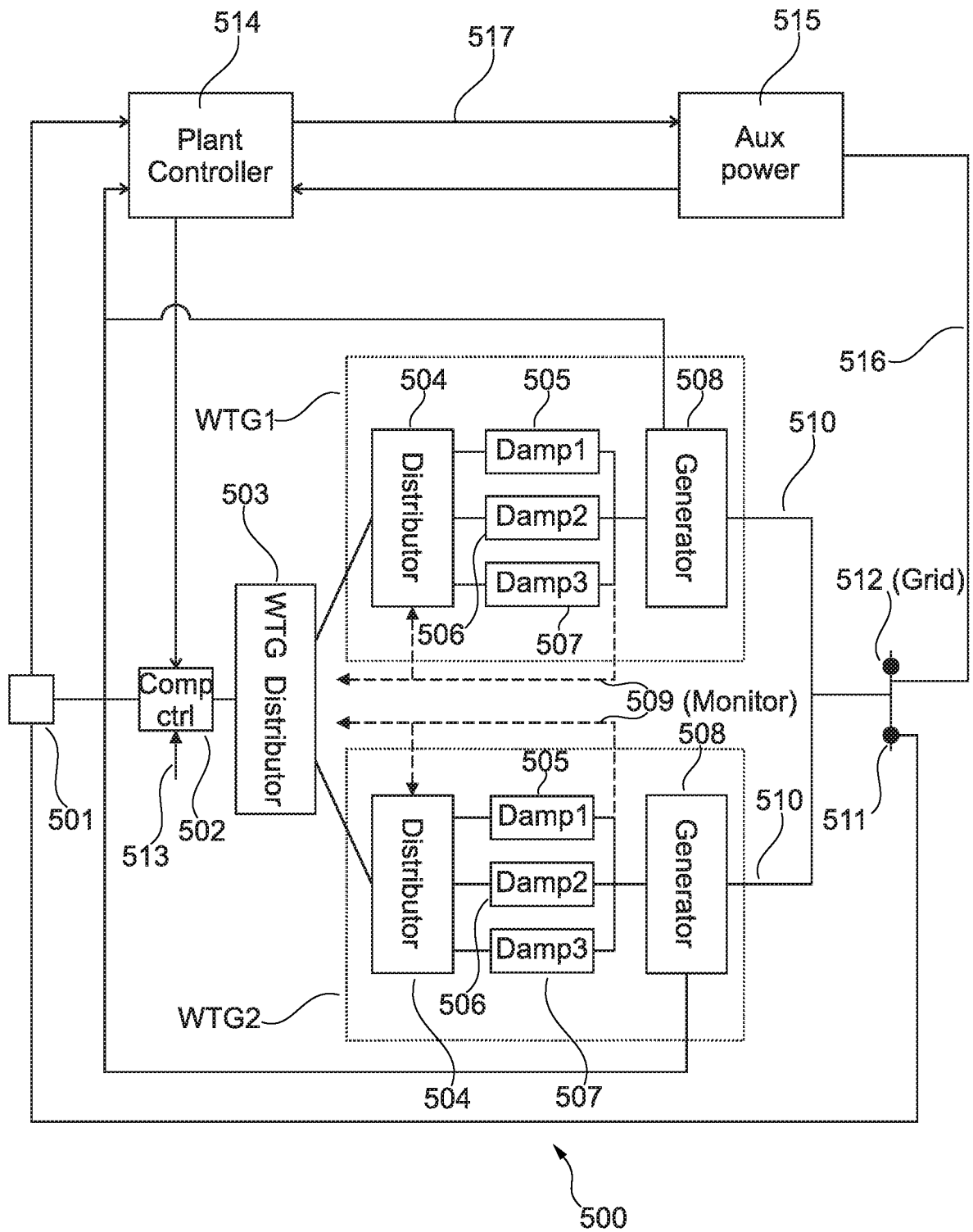
FIG. 5 shows a control system for controlling a plurality of wind turbines for reducing spectral disturbances in an electrical grid.

FIG. 5 illustrates an embodiment of the invention wherein a control system 500 is arranged for controlling a plurality of wind turbines for reducing spectral disturbances in the electrical grid 512. The control system 500 is equivalent to the control system 400 meaning that elements in FIGS. 4 and 5 perform the same or equivalent functions. The control system 500 mainly differs from control system 400 by having a plurality of distributors 504 (Distributor) and by having an additional wind turbine distributor 503 (WTG distributor). FIG. 5 indicates first and second wind turbines WTG1 and WTG2 which each comprises components 505-508. Alternatively, the distributors 504 could be located externally to the wind turbines, e.g. they could be comprised by a central power plant controller. As seen in FIG. 5, the point of measurement 511 for the electrical disturbance is located in the electrical grid 512. The point of measurement 511 could alternatively be in, or near, the PoC between the two wind turbines WTG1 and WTG2 with the electrical grid (not shown here). The plant controller 514 and the auxiliary energy source 515 in FIG. 5 are equivalent to the ones shown in FIG. 4, and these two elements also have the same features as described in FIG. 4. The plant controller 514 mainly differs from the plant controller 413 in FIG. 4 by having a plurality of inputs from WTGs with information about the actual power oscillation that is applied to the electrical grid.

The wind turbine distributor 503 (WTG distributor) is configured to determine wind turbine restriction values based on the restriction value determined by the compensation controller 502 (Comp ctrl). The wind turbine restriction values are determined from a plurality of the wind turbines. The wind turbine distributor 503 is further configured to assign the turbine restriction values to the wind turbines, i.e. to the distributors 504 associated with the wind turbines. Similarly to the embodiment in FIG. 4, each of the distributors 504 are configured to assign the received restriction value, here the received turbine restriction value for the associated of the wind turbine to the one or more damping controllers of the wind turbine for setting the limit of the control action of the one or more damping controllers.

The wind turbine distributor 503 may further be configured to select at least one of the wind turbines based on the disturbance information, and to assign the wind turbine restriction values to the selected wind turbines. The wind turbine distributor 503 may be configured similarly to the distributor 504 to perform selection of wind turbines based on disturbance information. For example, the distributor 503 may be configured to select wind turbines based on the disturbance information containing information about amplitude peaks 302-305 which may be associated with particular damping controllers 505-507. Since damping controllers of different wind turbines may have distinct frequencies of the amplitude peaks 302-305, the wind turbines responsible for the highest amplitude peaks 302-305 may be selected by the wind turbine distributor 503.

Additionally or alternatively, the wind turbine distributor 503 may be configured to select at least one of the wind turbines based on damping compensation values describing levels of damping compensation performed by the damping controllers of the wind turbines, and to assign the wind turbine restriction values to the selected wind turbines.

As shown in FIG. 5, the compensation values determined by the activity monitor 509 (Monitor) may be supplied to the damping controller distributors 504 and/or to the wind turbine distributor 503. Accordingly, based on the compensation values describing levels of damping compensation performed by the damping controllers 505-507, the wind turbine distributor 503 may select the wind turbines having the largest damping compensation values.

The functions of the distributors 504 for selecting at least one of the damping controllers 505-507 of the wind turbines WTG1-WTG2 based on the disturbance information and/or damping compensation values may be hosted by the wind turbines WTG1-WTG2 or by a central control unit such as a power plant controller configured to control a plurality of wind turbines WTG1-WTG2. Accordingly, the wind turbine distributor 503 may additionally comprise the functions of the distributors 504, so that distributors 504 located at each wind turbine may be dispensed with.

One or more of the components 401, 402, 503, 408 of the control system 400 may be comprised by a wind turbine, e.g. by a control system of a wind turbine, or one or more of the components 401, 402, 403, 408 may be located externally to the wind turbine, e.g. one or more of the components may be comprised by a central control unit such as a power plant controller configured to control a plurality of wind turbines. Accordingly, some of the components may be comprised by a wind turbine, and other components may be comprised by a central control unit.

Since the control system 500 is configured for controlling a plurality of wind turbines, at least components 501, 502, 503 may preferably be comprised by a central control unit such as a power plant controller, whereas damping controller distributors 504 may be comprised by the central control unit or by different wind turbines. Similar to FIG. 4 component 501 is a detector configured to determine disturbance information describing an electrical disturbance at a point of measurement 511 electrically connected to the wind turbine and component 502 is a compensation controller.

Accordingly, a power plant controller configured to control plurality of wind turbines in a wind plant may comprise the control system 400 where the distributor 504 is configured to assign restriction values to damping controllers 505-507 of a plurality of the wind turbines, or the power plant controller may comprise the control system 500 or part of the control system 500 such as components 501, 502, 503.

Moreover, a plant controller 514 configured to control the plurality of wind turbines and the auxiliary energy source 515 is depicted. The plant controller 514 may be configured to determine a set-point value 517 for the auxiliary energy source 515, and/or configured to control a limit on the amplitude of the wind turbine oscillations due to tower damping (for each WTG 100 in the wind farm).

In an embodiment of the invention, the plant controller 514 receives information from only a number of the plurality of WTGs while the remaining WTGs are not sending any information to the plant controller 514.

The plant controller 514 may be configured to select at least one auxiliary energy source 515 based on the availability of auxiliary power, and assign a set-point value to the selected auxiliary energy source. For example, the set-point value may be assigned to the auxiliary energy source having largest amount of auxiliary power available, or a plurality of set-point values may be assigned to the auxiliary energy sources having the largest amount of auxiliary powers available. The auxiliary energy source 515 provides power to the electrical grid via the connection 516.

Figure 6:
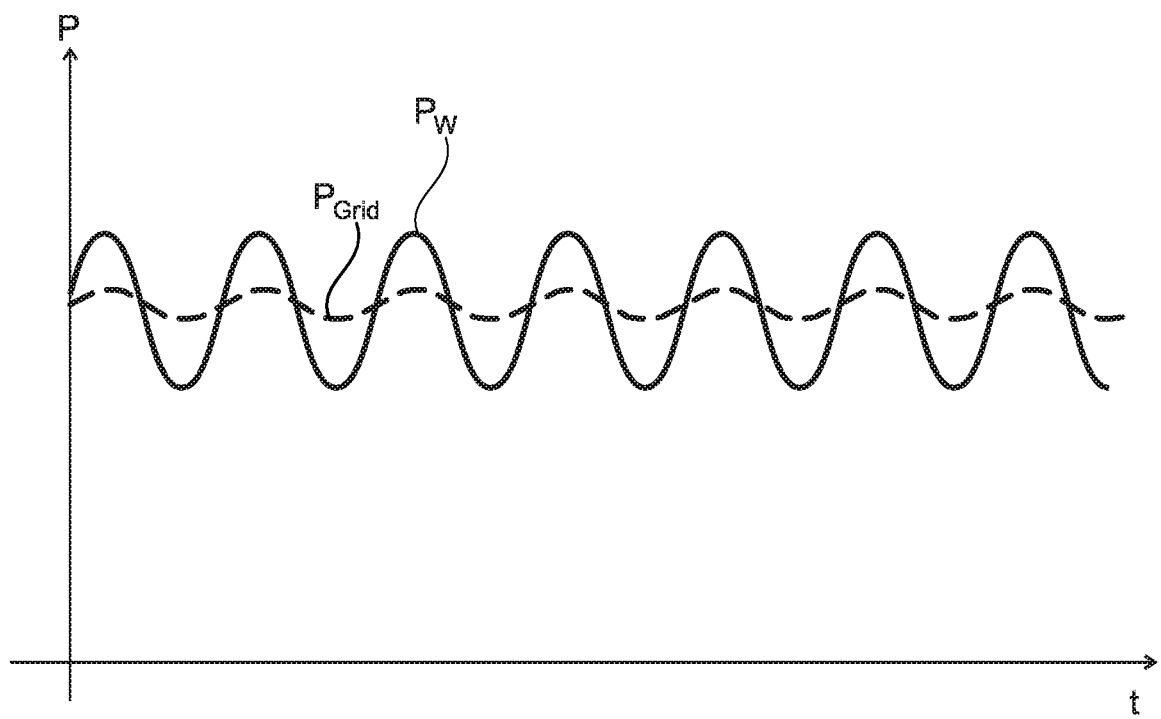
FIG. 6 illustrates an example of the characteristic of the output power of the wind turbine generator and the measured power at the electrical grid as a function of time.

FIG. 6 depicts the result of the present invention—namely to counteract power oscillations from WTGs. In FIG. 6 the electrical power from one or more WTGs, $P_W$, and the electrical power supplied to the electrical grid, $P_{Grid}$, is depicted as a function of time t. As depicted in FIG. 6 the oscillating power, $P_W$, from the one or more WTGs is considerably damped and smoothened using power from one or more auxiliary energy sources, and the resulting power, $P_{Grid}$, at the grid is thus within the allowable limit set by the grid requirements.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage. Any reference signs in the claims should not be construed as limiting the scope.

The invention claimed is:

1. A method for controlling a power plant for reducing spectral disturbances in an electrical grid connected to the power plant, the power plant comprising a plant controller, a wind turbine and an auxiliary energy source, wherein the wind turbine comprises:
   a rotor adapted to drive a power generator via a shaft, wherein the power generator is connected to the electrical grid, and
   a damping controller configured to compensate for structural oscillations of the wind turbine by controlling a torque on the shaft,
   the method comprising:
      in response to detecting a structural oscillation in the wind turbine, controlling, by the damping controller, torque variations in the shaft to counteract the structural oscillation;
      determining power output variations due to the torque variations at a point of measurement electrically connected to the power plant;
      determining set-points for the auxiliary energy source based on the power output variations; and
      injecting energy from the auxiliary energy source according to the set-points to counteract the power output variations at the point of measurement.

2. The method of claim 1, wherein the set-points for the auxiliary energy source are selected so that the power output variations at the point of measurement comply with a restriction value.

3. The method of claim 2, wherein the damping controller sets a control limit on an amplitude of the torque variations based on a difference between the power output variations and an available amount of energy to inject from the auxiliary energy source to comply with the restriction value.

4. The method of claim 1, wherein the auxiliary energy source comprises a photovoltaic element.

5. The method of claim 4, wherein the auxiliary energy source further comprises an energy storage element for storing excess energy from the photovoltaic element.

6. The method of claim 1, wherein the point of measurement coincides with a point of common coupling between the power plant and the electrical grid.

7. The method of claim 1, wherein the power output variations comprise spectrally resolved disturbance information indicating a frequency range of output power associated with the power output variations.

8. The method of claim 3, wherein a determination of an available amount of energy from the auxiliary energy source is at least partly based on a weather forecast.

9. A power plant comprising a plant controller, a wind turbine and an auxiliary energy source, wherein the wind turbine comprises:
   a rotor adapted to drive a power generator via a shaft, wherein the power generator is connected to an electrical grid; and
   a damping controller configured to compensate for structural oscillations of the wind turbine by controlling a torque on the shaft;
wherein the plant controller is configured to:
   in response to detecting a structural oscillation in the wind turbine, control, via the damping controller, torque variations in the shaft to counteract the structural oscillation;
   determine power output variations due to the torque variations at a point of measurement electrically connected to the power plant;
   determine set-points for the auxiliary energy source based on the power output variations; and
   inject energy from the auxiliary energy source according to the set-points to counteract the power output variations at the point of measurement.

10. The power plant of claim 9, wherein the auxiliary energy source comprises a photovoltaic element.

11. The power plant of claim 10, wherein the auxiliary energy source further comprises an energy storage element for storing excess energy from the photovoltaic element.

12. The power plant of claim 9, wherein the point of measurement coincides with a point of common coupling between the power plant and the electrical grid.

13. A control system for a power plant comprising a plant controller, a wind turbine and an auxiliary energy source, wherein the plant controller is configured to:
   in response to detecting a structural oscillation in a shaft of the wind turbine, control, by a damping controller, torque variations in the shaft to counteract the structural oscillation;
   determine power output variations due to the torque variations at a point of measurement electrically connected to the power plant;
   determine set-points for the auxiliary energy source based on the power output variations; and
   inject energy from the auxiliary energy source according to the set-points to counteract the power output variations at the point of measurement.

\* \* \* \* \*